United States Patent
Ito

(10) Patent No.: US 8,089,475 B2
(45) Date of Patent: Jan. 3, 2012

(54) DISPLAY DEVICE, SENSOR PANEL, POSITION-DETECTING DEVICE, POSITION-INPUTTING DEVICE, AND COMPUTER SYSTEM

(75) Inventor: Masamitsu Ito, Saitama-ken (JP)

(73) Assignee: Wacom Co., Ltd., Saitama-Ken (JP)

( * ) Notice: Subject to any disclaimer, the term of this patent is extended or adjusted under 35 U.S.C. 154(b) by 1322 days.

(21) Appl. No.: 11/723,744

(22) Filed: Mar. 21, 2007

(65) Prior Publication Data

US 2007/0285389 A1    Dec. 13, 2007

(30) Foreign Application Priority Data

Mar. 22, 2006    (JP) ............................. 2006-078959

(51) Int. Cl.
*G06F 3/045*    (2006.01)
*G09G 5/00*    (2006.01)
*G06F 3/044*    (2006.01)
*G08C 21/00*    (2006.01)

(52) U.S. Cl. .................. 345/174; 178/18.06; 345/156
(58) Field of Classification Search .................. 345/156, 345/173, 174; 178/18.05, 18.06; 341/20, 341/33, 34
See application file for complete search history.

(56) References Cited

U.S. PATENT DOCUMENTS

| | | | | |
|---|---|---|---|---|
| 5,261,747 A | * | 11/1993 | Deacutis et al. | 374/137 |
| 5,466,896 A | * | 11/1995 | Murakami et al. | 178/18.07 |
| RE40,867 E | * | 8/2009 | Binstead | 341/33 |

* cited by examiner

*Primary Examiner* — Srilakshmi K Kumar
(74) *Attorney, Agent, or Firm* — Berenato & White, LLC

(57) ABSTRACT

A display device is provided. The display device includes a display screen having a light-transmissible display conductor extending in a predetermined plane, and at least one detection conductor extending along the predetermined plane, the at least one detection conductor having at least one base line portion formed of a conductor of a first width and a narrow line portion including a plurality of narrow-line conductors of a second width connected in parallel between the at least one base line portion.

20 Claims, 9 Drawing Sheets

DISPLAY DEVICE, SENSOR PANEL, POSITION-DETECTING DEVICE, POSITION-INPUTTING DEVICE, AND COMPUTER SYSTEM

CROSS REFERENCES TO RELATED APPLICATIONS

The present application claims priority from Japanese Application No. P2006-078959 filed on Mar. 22, 2006, which application is incorporated herein by reference and to which priority is claimed.

FIELD OF THE INVENTION

The present invention relates to a display device, a sensor panel provided in the display device, a position-detecting device including the sensor panel, a position-inputting device having the position-detecting device and a position indicator, and a computer system including the position-inputting device.

BACKGROUND OF THE INVENTION

Generally, position-detecting devices which detect positions indicated by pen-type position indicators are known. For example, Japanese Published Patent Application No. 2002-215317 discloses a product in which a position-detecting device integrally formed with a liquid crystal display device is used and a position-inputting operation can be carried out by operating a position indicator on a display screen.

Typically, a display device such as a liquid crystal display device generates a lot of noise. Also, if other devices such as a substrate and the like are provided below a display device in an overlapped manner, a lot of noise is brought about by those devices (i.e., by the substrate and the like).

In an effort to mitigate the effects of the noise in the position-detecting device described above, the timing of picture scanning in the liquid crystal display device and the timing of signal transmission from the position indicator to the position-detecting device are adjusted.

In the position-detecting device described above, a loop coil is used for detecting an operation performed by a position indicator disposed behind a liquid crystal display panel. The loop coil and the position indicator send and receive signals with the liquid crystal display panel disposed therebetween.

In this case, a loop coil of a position-detecting device is disposed on the display surface of a liquid crystal display panel in order to mitigate the effect of the noise described above. However, since wiring of the loop coil is located on a display screen, the wiring may be visible when the display screen is being watched such that visibility of the display screen is adversely affected by the loop coil.

SUMMARY OF THE INVENTION

More particularly, the present invention provides wiring on the display surface side of a display screen in an overlapped manner without reducing the visibility of the display screen.

Additional aspects and advantages of the present invention will be set forth in part in the description which follows and, in part, will be obvious from the description, or may be learned by practice of the invention.

The foregoing and/or other aspects and advantages of the present invention are achieved by providing a display device including a display screen having at least one light-transmissible display conductor extending in a predetermined plane, and at least one detection conductor extending along the predetermined plane, the at least one detection conductor having at least one base line portion formed of a conductor of a first width, a narrow line portion including a plurality of narrow-line conductors of a second width connected between the at least one base line portion.

The foregoing and/or other aspects and advantages of the present invention are also achieved by providing a display device, including a display panel having a display region in which images are displayed, and a sensor panel disposed on a display side of the display panel, the sensor panel including at least one elongated detecting conductor having a first width outside the display region of the display panel and a second width in the display region of the display panel, the first and second widths being different from one another.

The foregoing and/or other aspects and advantages of the present invention are also achieved by providing a display device having a display screen, a detection conductor capable of being used as a sensor disposed in the same plane as a display conductor of the display device. This detection conductor has a narrow line portion formed to be small in width such that the detection conductor is difficult to see. As a result, the display device is capable of also being used as a sensor without reducing the visibility of the display screen. Further, the narrow line portion includes a plurality of narrow-line conductors connected in parallel such that an electric resistance value is small even if the widths of the narrow-line conductors are small. Furthermore, since the display conductor and the detection conductor are provided on the same plane, the detection conductor can be provided without increasing the thickness of the display device, thereby enabling this structure to be applied to a thin display device without difficulty.

The foregoing and/or other aspects and advantages of the present invention are also achieved by providing a sensor panel coupled with a display surface of a display device, the sensor panel including a plurality of detection conductors, each of the detection conductors having a base line portion formed of a conductor of a predetermined width and a narrow line portion formed of a plurality of narrow-line conductors being connected in parallel with ends on both sides thereof which are connected to the base line portion, the narrow-line conductors being narrower than the predetermined width. The narrow line portion overlaps with a display region of the display device and the base line portion does not overlap with the display region of the display device.

Since the narrow-line conductors are formed to be small in width, the narrow-line conductors are difficult to see, and the visibility of a screen shown by the display device is not reduced even though the narrow-line conductors are disposed on a display side of the display device. Therefore, the sensor panel can be provided on the display surface of the display device with almost no effect on the visibility of the screen. Also, since the plurality of narrow-line conductors are connected in parallel, an electric resistance value can be minimized even though the widths of the narrow-line conductors is small.

The narrow-line conductors include parallel wiring portions formed in the detection conductor, and a space between each adjacent pair of the narrow-line conductors is equal to each other. In this case, the alignment of the narrow-line conductors in the parallel wiring portions and the alignment of the narrow-line conductors positioned at both ends of the parallel wiring portions next to each other are equal to each other such that the alignment of the parallel wiring portions is uniform throughout the entire display region of the display device. Hence, the detection conductor is difficult to see and the effect on the visibility of pictures and images is minimized.

Further, the display device displays the screen by changing the state of a plurality of pixels arranged in a predetermined direction. The sensor panel may be provided so that a center of each pixel in the display device is positioned between the adjacent pairs of the narrow-line conductors. In this case, the area within the pixels covered by the narrow-line conductors is minimized. Hence, the effect of the sensor panel on the visibility of the screen shown by the pixels is further minimized and/or reduced.

Alternatively, the narrow-line conductors in the parallel wiring portions may be provided on the borders between pairs of adjacent pixels. In this case, the narrow-line conductors are difficult to see, and the effect of the sensor panel on the visibility of screen can be further reduced.

The detection conductor may be formed of a loop coil of one turn or a plurality of turns.

The foregoing and/or other aspects and advantages of the present invention are also achieved by providing a sensor panel usable with a display device, the sensor panel including a plurality of detecting conductors extending along a major plane of the sensor panel, each of the detecting conductors including a first short and wide portion, a plurality of long and narrow portions connected in parallel with the first short and wide portion at first ends thereof, and a second short and wide portion connected to second ends of the plurality of long and narrow portions.

The foregoing and/or other aspects and advantages of the present invention are also achieved by providing a display panel, including a substrate, at least one conductive layer disposed on the substrate, the at least one conductive layer including segment electrodes and signal lines to apply a voltage to the corresponding segment electrodes, a pixel layer disposed on the at least one conductive layer and having a plurality of pixel units that transmit light based on operation of the segment electrodes, the pixel units being arranged in between the signal lines, wherein the signal lines are operable between a display mode in which the signal lines control the corresponding segment electrodes to operate the corresponding pixel units to display an image and a sensing mode in which the signal lines sense an electromagnetic interaction with an external position indicator positioned near the display panel.

The foregoing and/or other aspects and advantages of the present invention are also achieved by providing a position detecting device including the above-mentioned sensor panel and a detection circuit to detect a position-inputting operation performed by an external position indicator by detecting electromagnetic interaction between the detection conductors provided in the sensor panel and the external position indicator.

The position-inputting operation performed by a position indicator is detected using the detection conductors in the sensor panel provided on a display surface of the display device. Here, the detection conductors have been arranged on the display surface of the display device such that a distance between the detection conductors and the position indicator is small such that there is no noise-generating object therebetween. As a result, the position-inputting operation can be detected easily and reliably.

Furthermore, when the detection conductors are used to transmit signals to the position indicator, the position detecting device can be driven at a low voltage due to the relationship between an electric current and electric resistance value of the detection conductors. As a result, power consumption can be minimized.

The detection circuit described above may include a selector to select a detection conductor from a plurality of detection conductors provided in the sensor panel, a signal detector which, when a signal has been transmitted from the position indicator, detects the signal received by the selected detection conductor, and a detection processor which calculates a position indicated by the position indicator based on the detected signal. In this case, the position of the position indicator is detected based on the signal received by a detection conductor of the sensor panel provided on the display surface of the display device, hence the signal is surely received to detect the position.

The foregoing and/or other aspects and advantages of the present invention are also achieved by providing a display device which displays a screen, in which the above-described sensor panel is provided on or coupled with the display surface of the display device.

The foregoing and/or other aspects and advantages of the present invention are also achieved by providing a position-inputting device which has a position indicator having at least one coil, and a position-detecting device for detecting a position-inputting operation performed by the position indicator. The position-detecting device includes the above-mentioned sensor panel and a detection circuit which, by detecting electromagnetic interaction between the detection conductors provided in the sensor panel and the at least one coil included in the position indicator, detects the position-inputting operation performed by the position indicator.

The foregoing and/or other aspects and advantages of the present invention are also achieved by providing a position inputting device usable with a display panel, including a position indicator, a sensor panel combinable with a display side of the display panel, the sensor panel including a plurality of detecting conductors each having outer conductive portions disposed on opposite sides of the display panel and a plurality of inner conductive portions electrically connected between the outer conductive portions and extending across the display panel when the sensor panel is combined with the display panel, and a position detecting unit to detect an interaction between the position indicator and the detecting conductors of the sensor panel to determine a position of the position indicator relative to the sensor panel.

The foregoing and/or other aspects and advantages of the present invention are also achieved by providing a computer system including a position-inputting device having a position indicator with at least one coil, and a position-detecting device for detecting a position-inputting operation performed by the position indicator. The position-detecting device includes the sensor panel described above and a detection circuit which, by detecting electromagnetic interaction between the detection conductors provided in the sensor panel and at least one coil included in the position indicator, detects a position-inputting operation performed by the position indicator.

The position-inputting operation performed by the position indicator is detected using the detection conductors in the sensor panel provided on a display surface of the display device, without reducing the visibility of a screen of the display device. As a result, a position-inputting operation can be detected easily and surely.

Furthermore, when the detection conductors are used to transmit signals to the position indicator, the position-inputting device and the computer system can be driven at a low voltage based on the relationship between an electric current and electric resistance value of detection conductors. As a result, the position-inputting device and the entire computer system which includes the position-inputting device consume less power.

The foregoing and/or other aspects and advantages of the present invention are also achieved by a providing method of manufacturing a sensor panel for use with a display device, the method including providing a substrate, and forming a plurality of detecting conductors extending along a plane of the sensor panel on the substrate, each of the detecting conductors including a first wide portion, a plurality of narrow portions connected in parallel with the first wide portion at first ends thereof, a second wide portion connected to second ends of the plurality of narrow portions, and applying the substrate with the detecting conductors to the display panel.

According to embodiments of the present invention, a sensor panel including detection conductors can be provided on a display surface of a display device without reducing the visibility of a screen of the display device. Accordingly, the effect of magnetic noise from a rear surface of the display device on the detection conductors can be prevented, and the sensor panel can be provided in display devices of various sizes and shapes. Furthermore, the sensor panel can be assembled with the display device without difficulty, thereby enabling a production process to be efficient.

BRIEF DESCRIPTION OF THE DRAWINGS

The accompanying drawings are incorporated in and constitute a part of the specification. The drawings, together with the general description given above and the detailed description of the embodiments and methods given below, serve to explain the principles of the invention. In such drawings.

DESCRIPTION OF THE EMBODIMENTS

Figure 1:
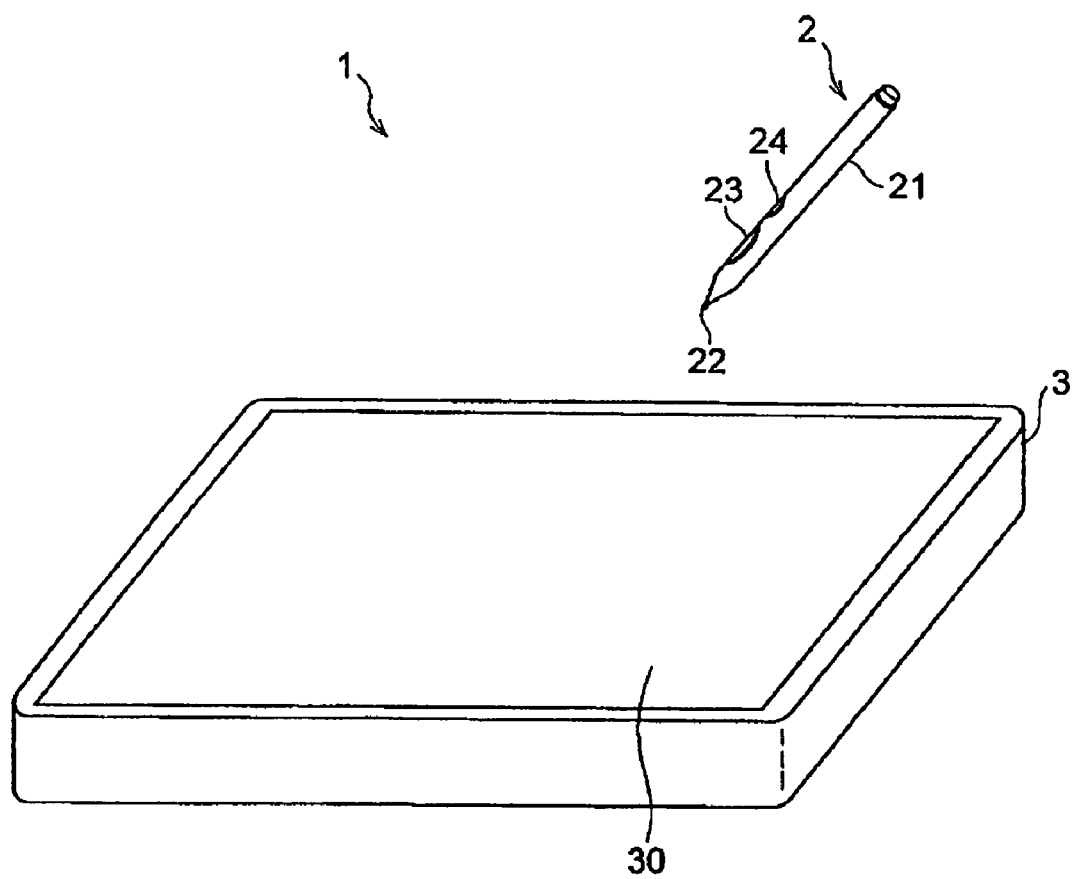
FIG. 1 is a schematic external view illustrating a computer system according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples illustrated and described in this section in connection with the embodiments and methods. The invention according to its various aspects is particularly pointed out and distinctly claimed in the attached claims read in view of this specification, and appropriate equivalents.

FIG. 1 is a schematic external view illustrating a computer system 1 according to an embodiment of the present invention. As illustrated in FIG. 1, the computer system 1 includes a tablet computer 3 and a position indicator 2 for performing a position-inputting operation on the tablet computer 3. The tablet computer 3 includes a display input portion 30 which displays various screens and/or images and which detects the position-inputting operation performed by the position indicator 2.

As illustrated in FIG. 1, the upper surface of the display input portion 30 may be approximately rectangular. In the display input portion 30, an X-Y orthogonal coordinate system can be hypothetically set, in which the X direction corresponds to a direction in which the long-side of the display input portion 30 extends and the Y direction corresponds to a direction in which the short-side of the display input portion 30 extends. When the position-inputting operation is performed by the position indicator 2, the X coordinate and the Y coordinate indicated by the position indicator 2 are detected.

The tablet computer 3 is a personal computer which executes various application programs in response to a position-inputting operation performed by the position indicator 2. In the tablet computer 3, the upper surface of the display input portion 30 exposed on the upper-side surface of the tablet computer 3 serves as a display portion which displays various screens and/or images relating to a program being executed. The upper surface of the display input portion 30 also serves as an input area capable of being operated by the position indicator 2. The position-inputting operation performed by the position indicator 2 is detected within this input area.

The position indicator 2 has a pen-type casing 21, and a core 22 protrudes from an end of the casing 21. Additionally, switches 23 and 24 are arranged on a side surface of the casing 21 and can be pressed and manipulated by the fingers of a user. The position indicator 2 incorporates a resonance circuit 27 (see FIG. 8) including a coil 25 (see FIG. 8) and a capacitor 26 (see FIG. 8). The position indicator 2 transmits and receives radio signals between the resonance circuit 27 and a position-detecting portion 4 (i.e., a position-detecting device) (see FIG. 6). That is, the position indicator 2 indicates a position with respect to the position-detecting portion 4 via the radio signals. The position indicator 2 and the position-detecting portion 4 may constitute a position-inputting device. The position-detecting portion 4 is described below with reference to FIG. 8.

When the position-inputting operation is performed, the core 22 which protrudes from the end of the position indicator 2 is pressed against the surface of the display input portion 30 by the user. The position indicator 2 generates a signal corresponding to the pressing force (writing pressure) applied to the core 22 and then transmits the generated signal to the position-detecting portion 4 via the resonance circuit 27 (see FIG. 8).

Figure 7:
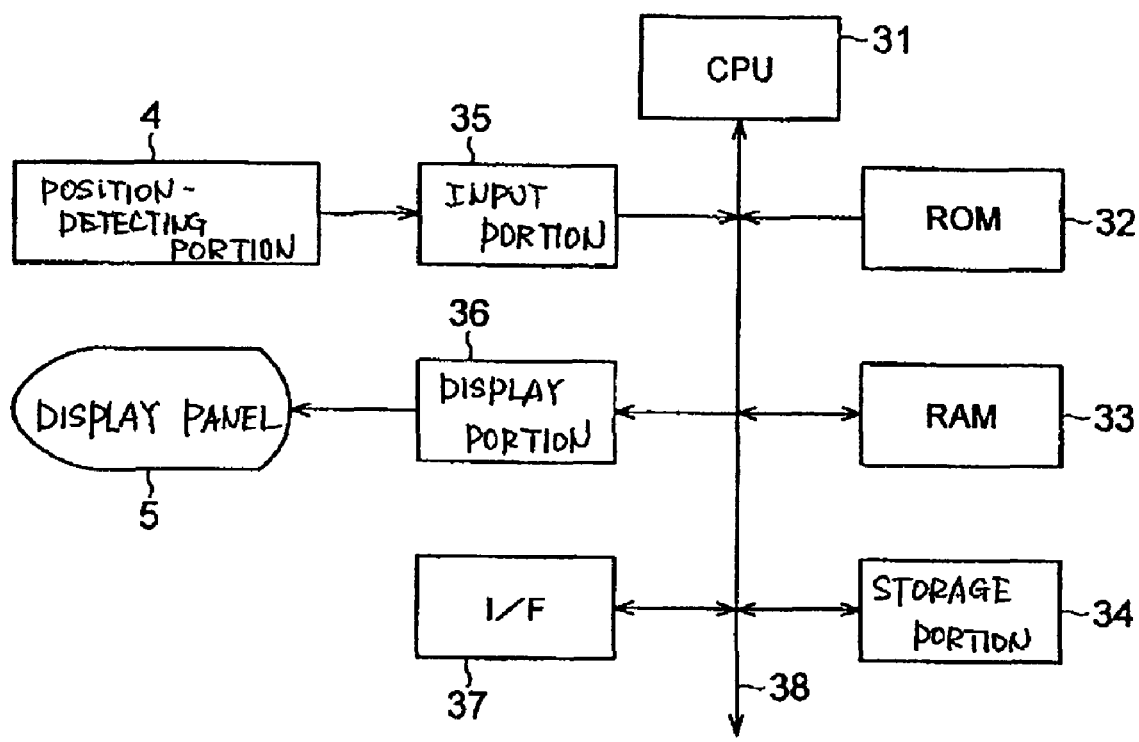
FIG. 7 is a block diagram of a tablet computer according to an embodiment of the present invention.

Further, the resonance circuit 27 (see FIG. 8) included in the position indicator 2 generates a signal corresponding to the operational states of the switches 23 and 24, and then transmits the signal to the position-detecting portion 4 (see FIG. 7). The position input by the position-inputting operation, the writing pressure at the time of the operation, and the operational states of the switches 23 and 24 can be detected by the position-detecting portion 4, based on the signal transmitted from the resonance circuit 27 (see FIG. 8) of the position indicator 2.

Figure 2:
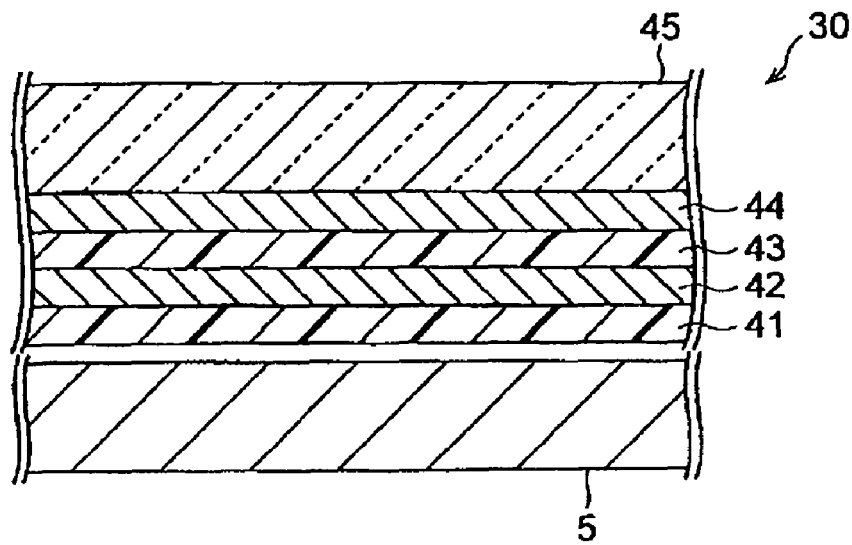
FIG. 2 is a sectional view illustrating a structure of a display input portion of the computer system of FIG. 1.

FIG. 2 is a sectional view illustrating a structure of the display input portion 30. In particular, FIG. 2 illustrates the structure of a display surface side of a display panel 5.

As best illustrated in FIG. 2, the display input portion 30 has a structure in which an insulating layer 41 (e.g., a first insulating layer), a loop coil group 42 (e.g., a first loop coil group), an insulating layer 43 (e.g., a second insulating layer), and a loop coil group 44 (e.g., a second loop coil group) are superimposed on the display surface of the display panel 5 (display device) in this order. A surface panel 45 is exposed on the surface of the tablet computer 3.

It should be noted that although there is a space between the display panel 5 and the insulating layer 41 in the structure illustrated in FIG. 2, this space need not necessarily be provided.

The insulating layers 41 and 43 may be made of plates or films formed of insulating material such as PET resin or various other resins. The insulating layers 41 and 43 are light-transmissible (transparent) to the extent that the visibility of a screen shown on the display panel 5 can be secured. The insulating layer 41 protects and insulates the loop coil group 42 and covers at least the surface of a conductor constituting the loop coil group 42. The insulating layer 41 may alternatively cover the entire loop coil group 42.

The insulating layer 43 protects and insulates the loop coil group 42 from the loop coil group 44 and is provided at least to cover either the surface of a conductor forming the loop coil group 42 or the surface of conductor forming the loop coil group 44. The insulating layer 43 may alternatively cover the entire surfaces of both the loop coil groups 42 and 44.

These insulating layers 41 and 43 may be formed by the methods of coating, vapor deposition, printing (including spraying), adhesion, or the like.

The loop coil groups 42 and 44 include a plurality of loop coils (i.e., detection conductors), each of which is formed of a conductor made of a metal (e.g., copper, silver, a compound of those metals, or the like). The loop coils of each of the loop coil groups 42 and 44 has one turn or a plurality of turns (e.g., two turns), and the loop coils are disposed parallel to each other. The conductor forming each loop coil may be an opaque conductor made of the metal described above. Alternatively, the conductor forming each loop coil may be made from a transparent conductive material such as ITO (Indium-Tin Oxide). The loop coils in the loop coil groups 42 and 44 may be formed by the method(s) of coating, vapor deposition, printing (including spraying), adhesion, or the like, or by etching planar conductors formed by those methods.

The surface panel 45 may be a plate made of glass, acrylic, a synthetic resin such as polycarbonate or the like, which is light-transmissible (transparent) to the extent that the visibility of screen shown on the display panel 5 can be secured. The surface panel 45 may also insulate the display panel 5. An anti-glare effect layer, anti-reflection effect layer, or the like may be formed on the surface panel 45 of the display input portion 30 to prevent glare and/or reflection. Additionally, a layer for enhancing abrasion resistance may be formed on the surface panel 45. Further, a layer having a friction coefficient different from that of the surface panel 45 may be formed on a surface of the surface panel 45 to discriminate the sense given when the core 22 of the position indicator 2 is applied to the surface panel 45.

The structure illustrated in FIG. 2 can be readily obtained, for example, by preparing a wiring substrate (e.g., sensor panel). The wiring substrate may be made by combining the loop coil groups 42 and 44 with the insulating layers 41 and 43 and the display panel 5 is integrally formed by adhesion or the like, and then by mounting this wiring substrate on the display surface side of the display panel 5.

Figure 3:
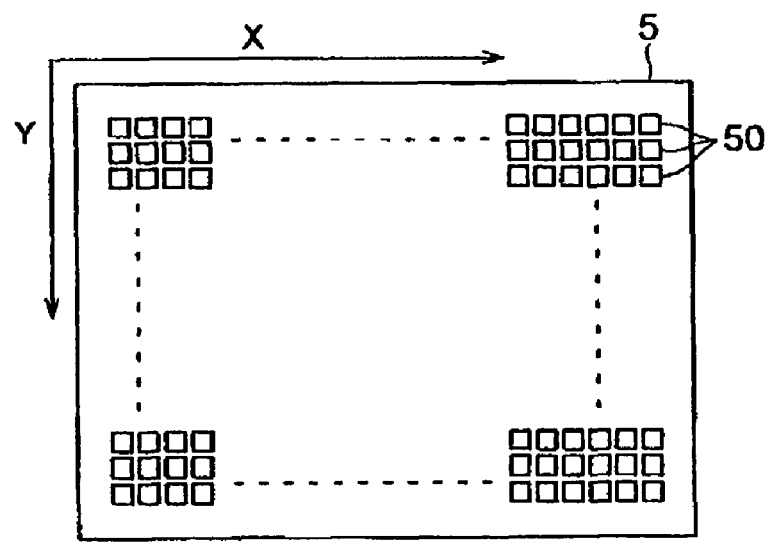
FIG. 3 is a plan view schematically illustrating pixels arranged in a display panel of the display input portion of FIG. 2.

FIG. 3 is a plan view schematically illustrating pixels 50 arranged in the display panel 5.

In the present embodiment, an LCD (liquid crystal display) panel may be used as the display panel 5 of the display input portion 30. In the display panel 5, the pixels 50 serve as a display element capable of switching the transmittance of light between two levels or more. The pixels 50 are disposed in the form of a matrix. More specifically, there is a structure in which the pixels 50 are linearly disposed in the X direction and in the Y direction of an X-Y orthogonal coordinate system hypothetically set with reference to the display input portion 30 of FIGS. 1 and 2, as described above. In the description that follows, the region in the display panel 5 which can be visibly seen from outside the tablet computer 3 will be referred to as a display region.

In the present embodiment, the display panel 5 may be formed of a 12-inch liquid crystal display panel of an XGA (horizontal 1024 dots×vertical 768 dots) display. This display will be used as an example. However, this example is not intended to limit the scope of the present invention. The embodiments of the present invention can be used with any size display panel. The exemplary display panel 5 has 1024 horizontal pixels 50 in the X direction and 768 vertical pixels 50 in the Y direction.

The display panel 5 may be a color LCD panel which has pixels 50 capable of displaying three colors corresponding to the three primary colors R (red), G (green) and B (blue). Alternatively, the display panel 5 may be a monochrome LCD panel which has pixels 50 capable of displaying only one color.

Figure 4:
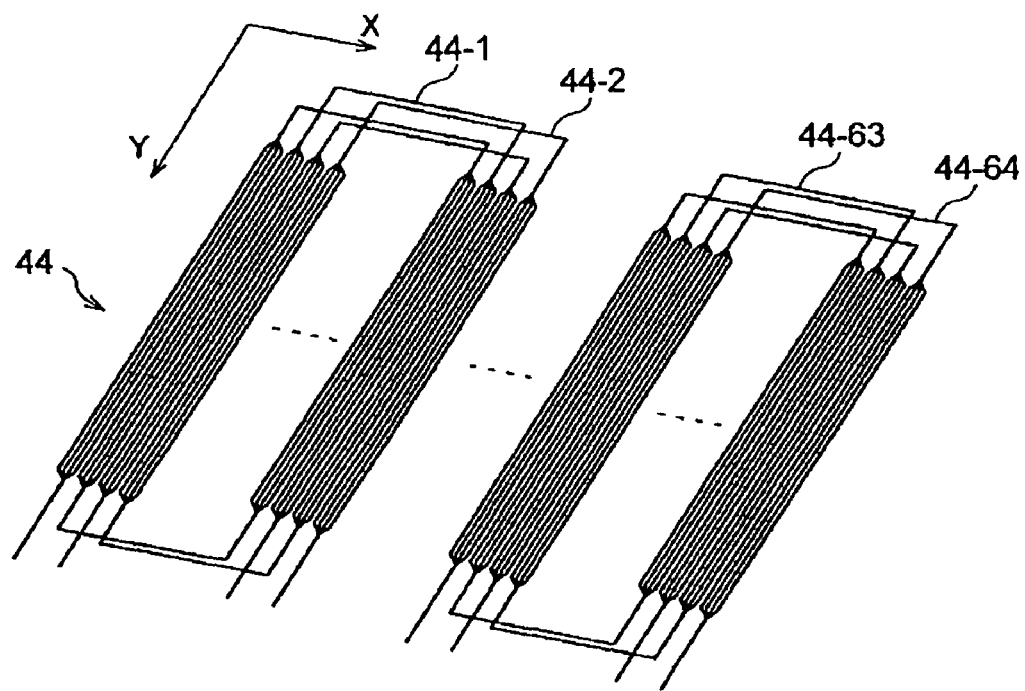
FIG. 4 is an exploded perspective view illustrating a schematic structure of a plurality of loop coil groups.
Figure 4:
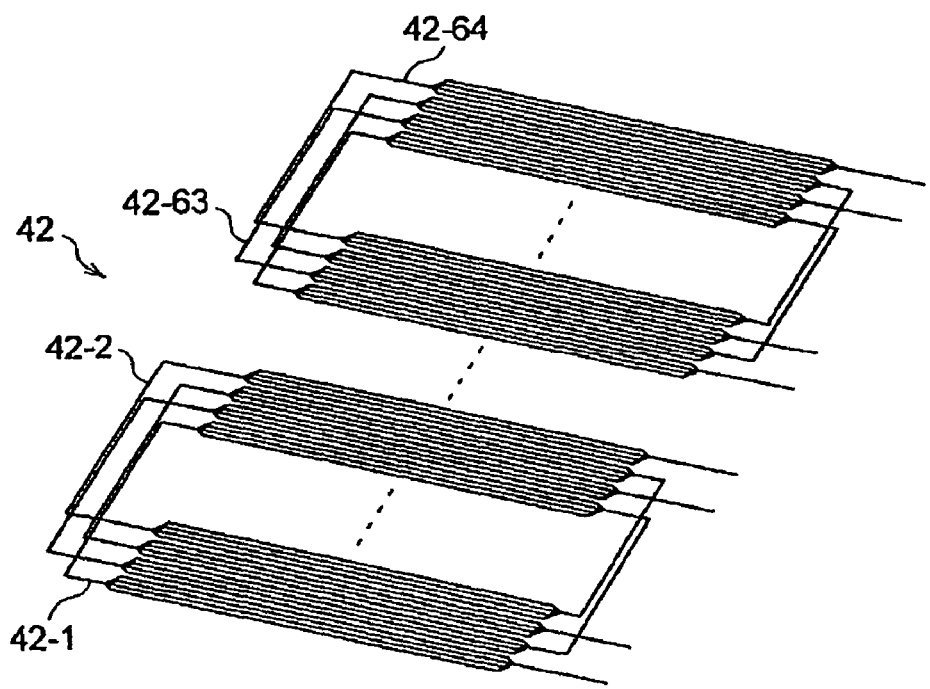

FIG. 4 is an exploded perspective view illustrating a schematic structure of the loop coil groups 42 and 44. Note that the insulating layers 41 and 43 have been omitted from FIG. 4 for illustration purposes.

As illustrated in FIG. 4, the loop coil group 42 includes sixty-four loop coils 42-1 to 42-64 disposed along the Y direction of the above-mentioned X-Y coordinate system.

Also, the loop coil group 44 includes sixty-four loop coils 44-1 to 44-64 disposed along the X direction of the X-Y coordinate system.

In the present embodiment, an example is explained in which each of these loop coils 42-1 to 42-64 and 44-1 to 44-64 is made of a two-turn loop coil that forms a double ring in a plane where the X-Y coordinate system is set. It should be understood that although sixty-four loop coils are illustrated and described in the loop coil groups 42 and 44, other numbers of loop coils may alternatively be used with the present invention. The number of loop coils may be varied according to the type of display panel 5 being used.

Figure 5:
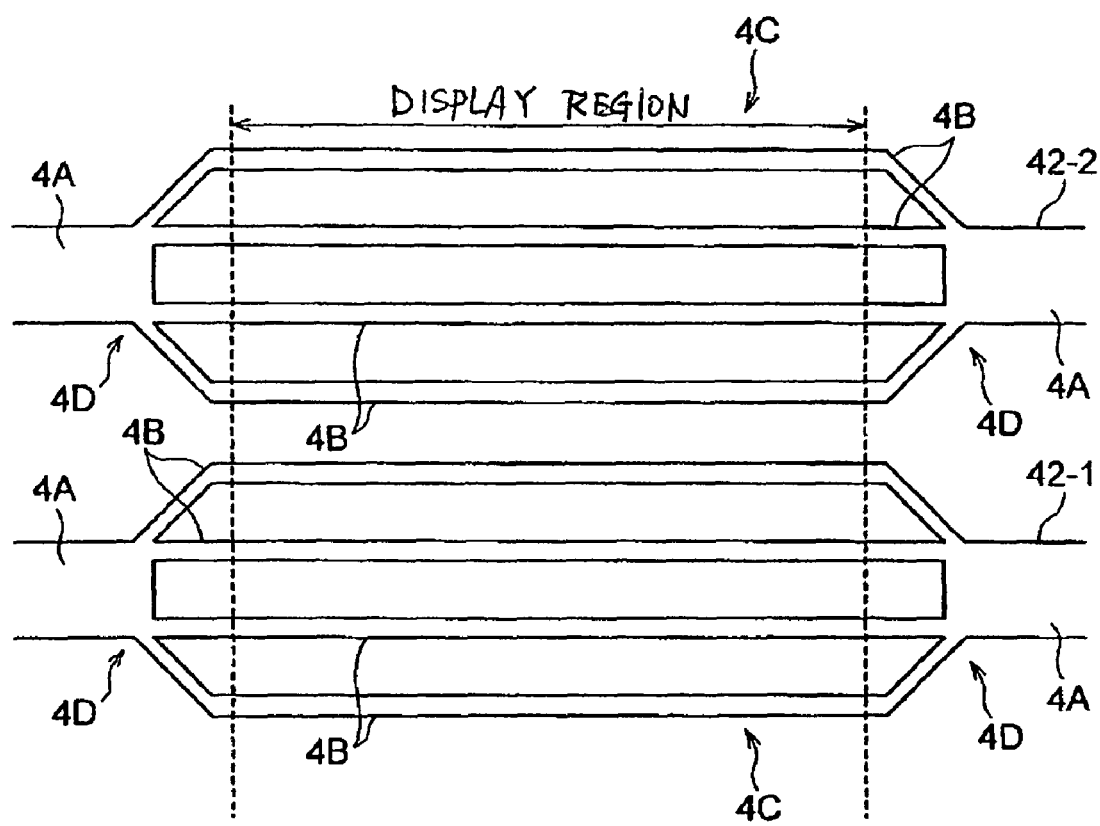
FIG. 5 is an enlarged plan view illustrating a structure of a plurality of loop coils.

FIG. 5 is an enlarged plan view illustrating a structure of the loop coils in the loop coil groups 42 and 44. Specifically, FIG. 5 illustrates a part of the loop coils 42-1 and 42-2 which overlaps with the display region of the display panel 5. The structure of all the loop coils in the loop coil groups 42 and 44 illustrated in FIG. 5 may be similar to that of the loop coils 42-1 and 42-2 illustrated in FIG. 4.

As illustrated in FIG. 5, the loop coils 42-1 and 42-2 each have a base line portion 4A of a predetermined width, and a narrow line portion 4C formed from four narrow lines 4B (i.e., narrow-line conductors) that are narrower than the base line portion 4A. Each of the four narrow lines 4B is electrically connected to the base line portion 4A via a branch-connecting portion 4D. Here, the base line portion 4A and the narrow lines 4B only need to be connected. The base line portion 4A and the narrow lines 4B may be connected after being formed separately, or the base line portion 4A and the narrow lines 4B may be formed integrally with one another, for example, in the same process. The branch-connecting portion 4D may have a fork-like shape which connects the narrow lines 4B with the base line portion 4A.

With reference to the narrow line portion 4C, the four narrow lines 4B are disposed parallel to each other and are spaced at regular intervals in the display region of the display panel 5. This part corresponds to a parallel wiring portion. Further, a space between the loop coil 42-1 and the loop coil 42-2 next to each other is equal to the interval between the four narrow lines 4B. Therefore, the loop coil groups 42 and 44 have a structure in which a large number of (e.g., 1024 in the present embodiment) narrow lines 4B are disposed at regular intervals.

The part of the loop coils 42-1 and 42-2 overlapping with the display region of the display panel 5 is made of the narrow lines 4B. Thus, in the display input portion 30, only the narrow lines 4B are visible by the user with respect to the loop coils in the loop coil groups 42 and 44, while the base line portion 4A is positioned at a location which is not seen from outside of a casing of the tablet computer 3.

Here, regarding the width of the base line portion 4A and the narrow lines 4B, the respective widths can be determined provided that each of the narrow lines 4B is narrower than the base line portion 4A. The widths may be determined based on criteria which are described as follows.

First, since the loop coil groups 42 and 44 are provided on the display side of the display panel 5, it is preferable that the loop coil groups 42 and 44 themselves be low in visibility so as not to reduce the visibility of the screen shown on the display panel 5.

From this viewpoint, the narrow lines 4B may be small in width. Specifically, the width of each of the narrow lines 4B may be about 30 µm (micrometers) or less. As a result, the narrow lines 4B become very low in visibility and can hardly be seen by a user even when opaque conductors (for example, copper, silver, a compound thereof, or the like) are used for the loop coil groups 42 and 44. Furthermore, forming the narrow lines 4B by etching allow the narrow lines 4B to be easily formed to have a width of about 10 um.

Second, since the loop coil groups 42 and 44 are used for sending and receiving signals, as described below, a smaller electric resistance value of the loop coil groups 42 and 44 is favorable. A smaller electric resistance value allows a higher electric current to flow at a lower voltage, and, as a result, signal intensity at the time of transmission and reception by the loop coils groups 42 and 44 can be strengthened.

From this viewpoint, the narrow lines 4B may be larger in width. However, as illustrated in FIG. 5, since each of the loop coils in the loop coil groups 42 and 44 in the present embodiment has a structure in which the plurality of narrow lines 4B are connected in parallel to the base line portion 4A, the electric resistance value of the loop coils, as a whole, can be kept low even if each narrow line 4B is thin. Therefore, signals can be sent and received by the loop coils without difficulty even if the width of each narrow line 4B is 30 µm or less.

Furthermore, if the width of each narrow line 4B is 30 µm or less as described above, opaque conductors can be used without problems, and the electric resistance value of the loop coils can be further lowered by using conductors having a small electric resistance value (for example, copper, silver, or a compound thereof).

Hence, the width of each of the narrow lines 4B is 30 µm or less, because the loop coils themselves can be made low in visibility and the electric resistance value can be lowered. Additionally, the conductors constituting the loop coils have a minimal electric resistance value.

In addition, when copper is used for the material of the loop coils, the surface exposed and visible on the surface of the display input portion 30 may be blackened by oxidation or the like. Blackening the loop coils may further reduce visibility thereof.

If a transparent conductive material (for example, ITO) is used for the material of the loop coils, the narrow lines 4B are very low in visibility, and the width of the narrow lines 4B may be made larger than 30 µm.

Also, there is no particular restriction on the width of the base line portion 4A, since the base line portion 4A is not in the display region. For example, the width can be made large to the extent that sixty-four loop coils can be provided for each of the loop coil groups 42 and 44 without difficulty.

The pitch of the narrow lines 4B of each loop coil may be equal to the pitch of the pixels 50 in the display panel 5.

Figure 6:
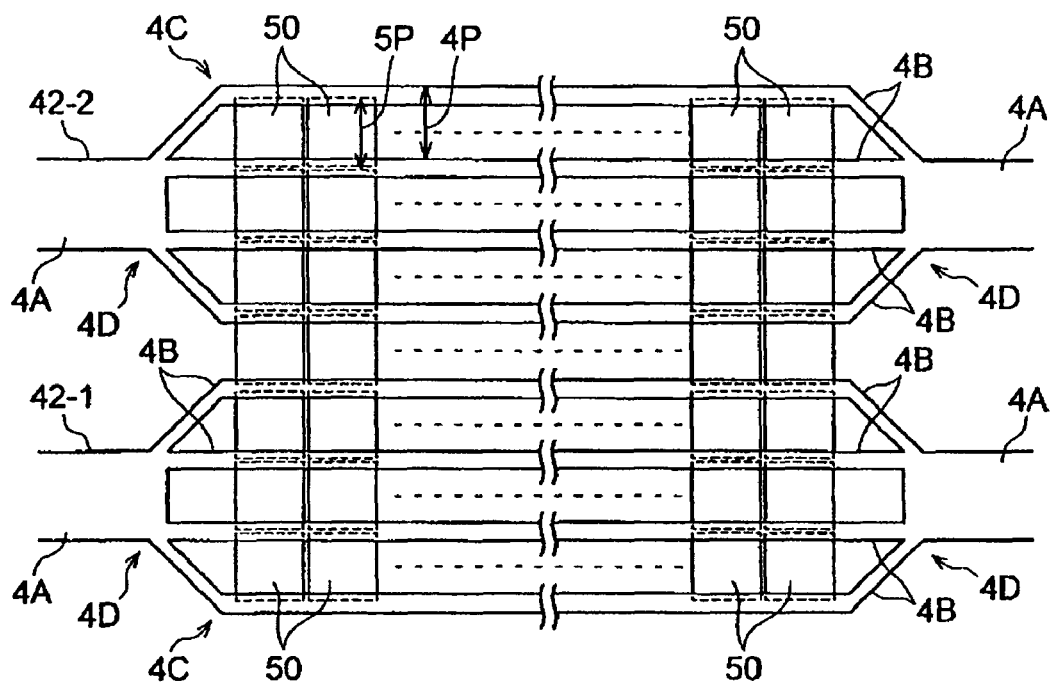
FIG. 6 is an enlarged plan view illustrating a positional relationship between the loop coils of FIG. 5 and pixels of the display panel of FIG. 3 according to an embodiment of the present invention.

FIG. 6 is an enlarged plan view illustrating a positional relationship between the loop coils in the loop coil groups 42 and 44 and the pixels 50 in the display panel 5.

It should be noted that although only two loop coils, namely, the loop coils 42-1 and 42-2 are illustrated in FIG. 6 for the convenience of explanation, the other loop coils (e.g., the other sixty-two loop coils in the loop coil group 42 and the sixty-four loop coils in the loop coil group 44) are similarly arranged in the loop coil groups 42 and 44.

As illustrated in FIG. 6, a pitch 4P of the narrow line 4B in the loop coils 42-1 and 42-2 may be equal to a pitch 5P of the pixels 50. Thus, the arrangement of the pixels 50 and the arrangement of the narrow lines 4B are made to form a uniform geometrical arrangement in the display region of the display panel 5. Hence, the narrow lines 4B are inconspicuous and difficult to see.

Further, regarding the structure illustrated in FIG. 6, the narrow lines 4B are positioned between adjacent pixels 50. In this manner, an area in which the pixels 50 are covered by the narrow lines 4B is minimized, and the area in which each pixel 50 is covered by the narrow lines 4B becomes virtually uniform throughout the display region. Therefore, the visibility of the narrow lines 4B are further minimized.

If seen from a different viewpoint, the structure illustrated in FIG. 6 can be considered to be such that the narrow lines 4B of the loop coils are positioned on borders between the adjacent pixels 50, thereby lowering the visibility of the narrow lines 4B.

It should be noted that although one pixel 50 is illustrated as being positioned between two narrow lines 4B in the present embodiment, a plurality of pixels 50 may be disposed between two narrow lines 4B. In this case, since the narrow lines 4B extend on the borders between the pixels 50, the narrow lines 4B are difficult to see.

Alternatively, the plurality of narrow lines 4B may be positioned above one pixel 50. In this case, since the size of the pixel 50 is large in comparison with the width of the narrow line 4B, the narrow lines 4B are still difficult to see. In particular, one pixel 50 includes three color segments of R, G and B in the display panel 5 that is a liquid crystal display panel for color display. In this case, when the narrow lines 4B are provided to extend on the borders between the color segments of the pixel 50, the narrow lines 4B do not interfere with a display even if the narrow lines 4B are positioned above the pixel 50.

Next, the configuration and operation of the tablet computer 3 of FIG. 1 including the position-detecting portion 4 will be explained.

FIG. 7 is a block diagram illustrating a configuration of the tablet computer 3.

The tablet computer 3 includes a CPU (central processing unit) 31 which controls operations of the tablet computer 3 by executing control programs of various kinds, a ROM (read only memory) 32 which stores control programs and the like executed by the CPU 31, a RAM (random access memory) 33 which functions as a work area that temporarily stores program data and the like executed by the CPU 31, and a storage portion 34 which stores control programs and application programs executed by the CPU 31 and data relating to these programs.

The tablet computer 3 further includes the position-detecting portion 4 which detects the position-inputting operation performed by the position indicator 2 (see FIG. 1) at the display input portion 30 (see FIG. 1), an input portion 35 which generates operational information corresponding to the position-inputting operation detected by the position-detecting portion 4. The input portion 35 then provides the operational information corresponding to the position-inputting operation to the CPU 31.

The tablet computer 3 also includes a display portion 36 which drives the display panel 5 (see FIGS. 2 and 3) after analyzing screen display data generated by the CPU 31. The display panel 5 functions as a display device which is driven by the display portion 36 to display various screens and/or images including various display objects such as characters, still images, and moving images. The tablet computer 3 also includes an interface (I/F) 37 which is connected to an apparatus outside the tablet computer 3. The various portions of the tablet computer 3 are connected via a bus 38.

The CPU 31 controls each portion of the tablet computer 3 by retrieving and executing control programs stored in the ROM 32. Further, the CPU 31 retrieves application programs stored in the storage portion 34 and executes the application programs in the work area of the RAM 33. Accordingly, various types of data processing operations are performed.

During the execution of the control programs and the application programs, the CPU 31 generates screen display data for displaying a screen which relates to the programs being executed. The CPU 31 then outputs the screen display data to the display portion 36 to be displayed on the display panel 5.

Further, if operational information corresponding to the position-inputting operation performed by the position indicator 2 is input from the input portion 35, the CPU 31 determines (e.g., by discriminating) the content indicated by the position-inputting operation based on the input operational information and the screen display data output to the display portion 36. For example, the CPU 31 can determine whether an icon is being selected by the position indicator 2 or whether an item is being input by the position indicator 2 based on the operational information and the screen display data. The CPU 31 then performs an operation corresponding to the indicated content that is determined.

The position-detecting portion 4 is provided as hardware arranged in the display input portion 30 (see FIG. 1). In response to the position-inputting operation performed by the position indicator 2 on the surface of the display input portion 30, which defines an input area, the position-detecting portion 4 detects the position indicated by the position-inputting operation, the writing pressure at the time of the operation, and the operational states of the switches 23 and 24 (see FIG. 1). Then, the position-detecting portion 4 outputs an operational signal including the above detected results to the input portion 35. Subsequently, the input portion 35 generates the operational information corresponding to the position-inputting operation performed by the position indicator 2 by analyzing the operational signal input by the position-detecting portion 4. The input portion 35 then outputs the operational information to the CPU 31.

Figure 8:
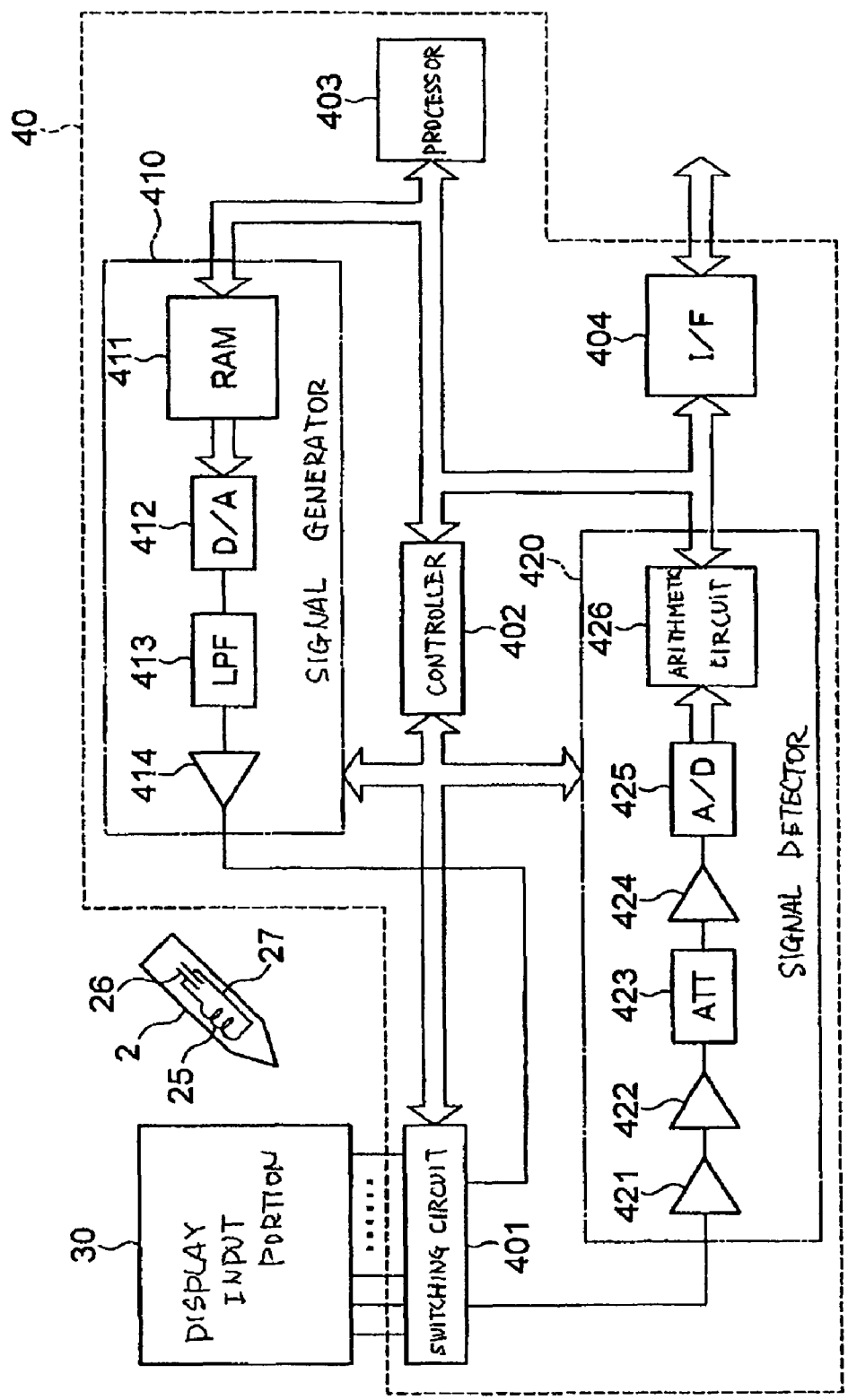
FIG. 8 is a diagram illustrating internal circuits of a position-detecting portion of the tablet computer of FIG. 7.

FIG. 8 is a diagram illustrating an internal circuit 40 of the position-detecting portion 4 of the tablet computer 3.

For illustration purposes, FIG. 8 illustrates an internal circuit of the position indicator 2 and the display input portion 30 as well as the internal circuit 40 of the position-detecting portion 4.

As illustrated in FIG. 8, the position indicator 2 includes the resonance circuit 27 having the coil 25 and the capacitor 26. The inductance and capacitance values of the coil 25 and capacitor 26, respectively, are set such that a predetermined frequency fo is made a resonance (tuning) frequency fo. In the resonance circuit 27, a capacitor (not illustrated in FIG. 8) is connected to the capacitor 26 in parallel via the switches 23 and 24, so as to make the resonance frequency of the resonance circuit 27 low when the switches 23 and 24 have been operated.

The internal circuit 40 of the position-detecting portion 4 includes a switching circuit 401, a controller 402, a processor 403, an interface 404, a signal generator 410, and a signal detector 420.

The switching circuit 401 is connected to (1) the loop coils in the loop coil groups 42 and 44 (not illustrated in FIG. 8) provided in the display input portion 30, (2) the signal generator 410, and (3) the signal detector 420. The switching circuit 401 is controlled by the controller 402 to sequentially select one loop coil from the loop coil groups 42 and 44 by switching from one loop coil to another. The switching circuit 401 also selects the signal generator 410 or the signal detector 420 by switching between the two. Thus, the signal generator 410 or the signal detector 420 is connected to the selected loop coil in the loop coil groups 42 and 44 by the switching circuit 401, thereby enabling a signal sending or receiving operation.

The signal generator 410 includes a random access memory (RAM) 411, a digital/analog converter (D/A converter) 412, a low-pass filter (LPF) 413, and a drive amplifier 414. The signal generator 410 generates an AC signal with an arbitrary frequency, phase, and amplitude.

The RAM 411 stores data corresponding to the AC signal to be generated. For example, the RAM 411 stores the data corresponding to the AC signal as digital data including a plurality of bits (e.g., six bits) corresponding to predetermined AC signals prepared in advance in the processor 403 or in a host computer. The D/A converter 412 converts the digital data retrieved from the RAM 411 into an analog pulse (PAM) signal in order. The low-pass filter 413 removes high-frequency components from the PAM signal, and outputs only envelope components of the PAM signal. The drive amplifier 414 amplifies the envelope components to a suitable level, and then outputs the amplified envelope components as the AC signal. The writing and retrieval of data in the RAM 411, and the conversion in the D/A converter 412 are carried out according to information and/or instructions from the controller 402.

It should be noted that instead of the RAM 411, a read-only memory having digital data corresponding to the AC signal(s) stored therein may alternatively be used. A bus buffer may also be used if a high-speed CPU is used for the processor 403.

The signal detector 420 includes a preamplifier 421, amplifiers 422 and 424, an attenuator (ATT) 423, an analog/digital converter (A/D) converter 425, and an arithmetic circuit 426. The signal detector 420 detects amplitude and phase angle with respect to arbitrary frequency components in received signals.

The preamplifier 421, the amplifiers 422 and 424, and the attenuator 423 amplify the received signals to an appropriate level. The A/D converter 425 samples the amplified received signals at a predetermined period (e.g., 250 nsec in this case) and converts the sampled received signals to digital data in a plurality of bits (e.g., six bits).

The arithmetic circuit 426 performs a predetermined calculation, for example, a discrete Fourier transform calculation described later on, using the digital data. The arithmetic circuit 426 obtains the amplitude and phase angle with respect to frequency components in the received signals based on the predetermined calculation. Adjustment of the degree of attenuation in the attenuator 423, conversion in the A/D converter 425, and calculation in the arithmetic circuit 426 are performed in accordance with information and/or instructions from the controller 402.

Based on an instruction from the processor 403, the controller 402 operates and controls the timing of each part of the internal circuit 40 according to a predetermined sequence, which is set in advance.

In addition, in order to reduce power consumption, when an electric wave is generated (transmitted) by the signal generator 410, the signal detector 420 is operated in a standby state. Similarly, when an electric wave is received by the signal detector 420, the signal generator 410 is operated in a standby state. Furthermore, when a signal has not been received (i.e., when the position indicator 2 has not been detected for a certain amount of time or more), both the signal generator 410 and signal detector 420 are operated the standby state.

The interface 404 is provided for exchanging data with the CPU 31 (see FIG. 7) via the input portion 35 (see FIG. 7). The interface 404 includes at least two registers directly linked to the input portion 35 (see FIG. 7). The registers have an FIFO (first-in, first-out) memory structure, and the host computer (not illustrated in FIG. 8) retrieves data according to a prescribed data format by accessing these registers several times.

The processor 403 is configured to have a known micro processor, ROM, or RAM into which programs and data have been written. The processor 403 performs calculation of a coordinate value of a designated point indicated by the position indicator 2 with respect to the display input portion 30. The processor 403 also executes data transmission with the host computer and total control of each part.

Operation of the internal circuit 40 will now be explained.

First, the processor 403 initializes each part, and writes digital data corresponding to sinusoidal signals of a frequency fo (i.e., the resonance frequency) prepared in advance (e.g., fo is 500 kHz in this case) to the RAM 411 of the signal generator 410. The digital data may include 128 pieces of 6-bit digital data indicating 16-wave sinusoidal signals of 500 kHz capable of being transmitted within a predetermined transmission period (e.g., 32 µsec in this case).

Next, the processor 403 writes into the controller 402 data for sequentially switching among the loop coils 42-1 to 42-64 (i.e., a first group of loop coils 42) and the loop coils 44-1 to 44-64 (i.e., a second group of loop coils 44). The processor 403 instructs the controller 402 to send and receive electromagnetic waves via the loop coils.

The sending and receiving of the electromagnetic waves is performed as follows. Specifically, the controller 402 sends a first switching data to the switching circuit 401, and starts up the signal generator 410. Also, the controller 402 sends data for selecting the signal generator 410 (i.e., switches) to be connected to the switching circuit 401. Thus, the signal generator 410 is connected to the loop coil selected by the switching circuit 401, thereby enabling signals to be sent via the selected loop coil.

The controller 402 also supplies the clock to cause digital data inside the RAM 411 to be sequentially transferred to the D/A converter 412 such that D/A conversion is performed to convert the digital data into PAM signals. As described above, the PAM signals are converted into envelope components (e.g., AC signals of 500 kHz) with high-frequency components being removed by the low-pass filter 413. The AC signals are then amplified to an appropriate level by the drive amplifier 414, and the AC signals are then provided to the switching circuit 401.

It should be understood that PAM signals may be practically unipolar signals formed of only plus components or minus components, and the PAM signals may be made into bipolar signals with DC elements being filtered by the low-pass filter 413, the drive amplifier 414, or a capacitor (not illustrated) inserted in between the drive amplifier 414 and the low-pass filter 413.

Then, the AC signals provided by the signal generator 410 are supplied to a loop coil (i.e., the selected loop coil) through the switching circuit 401. In this manner, the AC signals are transmitted as electromagnetic waves.

If the position indicator 2 is held in a roughly upright state (i.e., in the state of use on the display input portion 30), the electromagnetic waves excite the coil 25 in the position indicator 2. In turn, the excited coil 25 in the position indicator 2 generates induced voltages in the resonance circuit 27 which are synchronized with the AC signals.

On the other hand, when the transmission period (e.g., of 32 µsec) is over, the controller 402 operates the signal generator 410 in the standby state, starts up the signal detector 420, and sends data for selecting (e.g., by switching) the signal detector 420 to be connected to the switching circuit 401. Here, when the signal detector 420 is connected to the switching circuit 401, electromagnetic waves being transmitted from the selected loop coil in the display input portion 30 disappear immediately, but induced voltages generated in the resonance circuit 27 in the position indicator 2 gradually reduce and transmit electromagnetic waves from the coil 25.

Since the electromagnetic waves from the coil 25 of the position indicator 2 excite the loop coils of the display input portion 30, induced voltages (received signals) due to the electromagnetic waves from the coil 25 are generated in the loop coil (i.e., the selected loop coil) connected to the signal detector 420 via the switching circuit 401.

The received signals generated in the loop coil are amplified to an appropriate level by the preamplifier 421, the amplifiers 422 and 424, and the attenuator 423. The received signals are then input into the A/D converter 425.

After starting up the signal detector 420 from the standby state, the controller 402 supplies the clock to cause the received signals to be sampled (e.g., 128 times at intervals of 250 nsec) by the A/D converter 425 such that A/D conversion is performed on the amplified received signals. Also, the controller 402 controls the arithmetic circuit 426 to perform a discrete Fourier transform calculation, and then the result from the arithmetic circuit 426 is provided to the processor 403 and/or the controller 402. It should be noted that the time (e.g., 32 µsec) used for sampling the received signals (e.g., 128 times at intervals of 250 nsec) is referred to as a reception period.

Next, the controller 402 renews and replaces data in the switching circuit 401 with second switching data. In this series of operations, a next loop coil in the loop coil groups 42 and 44 (see FIG. 4) is selected by the switching circuit 401, and then the operations of sending electromagnetic waves and receiving electromagnetic waves via the next loop coil are performed. These operations are repeated by sequentially switching and selecting all the loop coils in the loop coil groups 42 and 44 in the manner described above.

Once the transmission operation (i.e., sending electromagnetic waves) and the reception operation (i.e., receiving electromagnetic waves) are performed using all the loop coils in the loop coil groups 42 and 44, the processor 403 makes a calculation based on the pattern of a received signal level obtained when each loop coil is selected. Specifically, the processor 403 stores, in advance (i.e., pre-stores), the pattern of a received signal level obtained when the position indicator 2 is positioned adjacent to each loop coil. The loop coil closest to the position indicator 2 is specified by performing the calculation and comparing the corresponding pre-stored pattern and the pattern actually obtained when selecting each loop coil. Here, interpolation calculation may be performed if necessary.

The processor 403 then generates operational signals which indicate coordinates corresponding to the loop coil being specified. That is, the processor 403 determines coordinates (absolute position coordinates) showing the position of the position indicator 2 in the input area, and outputs the determined coordinates to the input portion 35 (see FIG. 7) of the tablet computer 3.

The processor 403 also detects a change in the resonance frequency of the resonance circuit 27 of the position indicator 2 based on the signals being received in each selected loop coil. The operational states of the switches 23 and 24 of the position indicator 2 and the writing pressure applied to the core 22 of the position indicator 2 are detected based on this change in resonance frequency. The processor 403 then generates operational signals indicating the operational states of the switches 23 and 24 in the position indicator 2 and the writing pressure, and outputs the generated operational signals to the input portion 35 (FIG. 7) of the tablet computer 3 via the interface 404.

As described above with reference to FIGS. 1 to 8, the computer system 1 according to embodiments of the present invention has a structure, in which the loop coil groups 42 and 44 are provided on a surface of the display side of the display panel 5, in the display input portion 30 included in the position-detecting portion 4 which detects the position-inputting operation performed by the position indicator 2. Further, each loop coil in the loop coil groups 42 and 44 is formed of the narrow line portion 4C made from the plurality of narrow lines 4B which overlap with the display region of the display panel 5.

Accordingly, visibility of loop coils in the loop coil groups 42 and 44 in the display region of the display panel is minimized, thereby preventing the inconvenience associated with the loop coils themselves being visible, and preventing the visibility of the screen shown on the display panel 5 from being reduced.

Further, in the narrow line portion 4C of each loop coil in the loop coil groups 42 and 44, since the plurality of the narrow lines 4B are connected in parallel to the base line portion 4A at both sides, the electric resistance value of the narrow line portion 4C can be minimized as a whole even if each narrow line 4B is made thin.

When the position-inputting operation performed by the position indicator 2 is detected using the loop coil groups 42 and 44 provided on the surface of the display side of the display panel 5, the distance between the position indicator 2 and the loop coil groups 42 and 44 is extremely small and there is no noise-generating object intervening in between. Therefore, electromagnetic interaction between the position indicator 2 and the loop coil groups 42 and 44 can be detected by the position-detecting portion 4 without difficulty. Hence, it becomes possible to drive the internal circuit 40 at a low voltage due to the relationship between an electric current and an electric resistance value with respect to the operation of transmitting a signal from the internal circuit 40 to the position indicator 2. Accordingly, power consumption of the internal circuit 40 can be reduced, power consumption of a tablet computer 3 can also be reduced, and the tablet computer 3 can be driven for a long period of time.

Further, since the loop coil groups 42 and 44 are provided on the display surface side of the display panel 5, there are no restrictions imposed on the shape or size of the display panel 5. Therefore, display panels of various shapes and sizes can be used as the display panel 5. This enables costs to be reduced by using a general-purpose display panel. This also enables a large display panel to be used with the embodiments of the present invention. In addition, since the loop coil groups 42 and 44 can be provided in the display panel 5 without difficulty, a production process thereof is efficient due to the fact that the assembly of the display panel 5 with the loop coil groups 42 and 44 is made easy.

As described above with reference to FIGS. 4 to 6, each loop coil in the loop coil groups 42 and 44 has a structure in which the four narrow lines 4B are connected to the base line portion 4A at the branch-connecting portion 4D. Note that the structure of this branch-connecting portion 4D may be modified to reduce the electric resistance value even further.

Example 1

Figure 9:
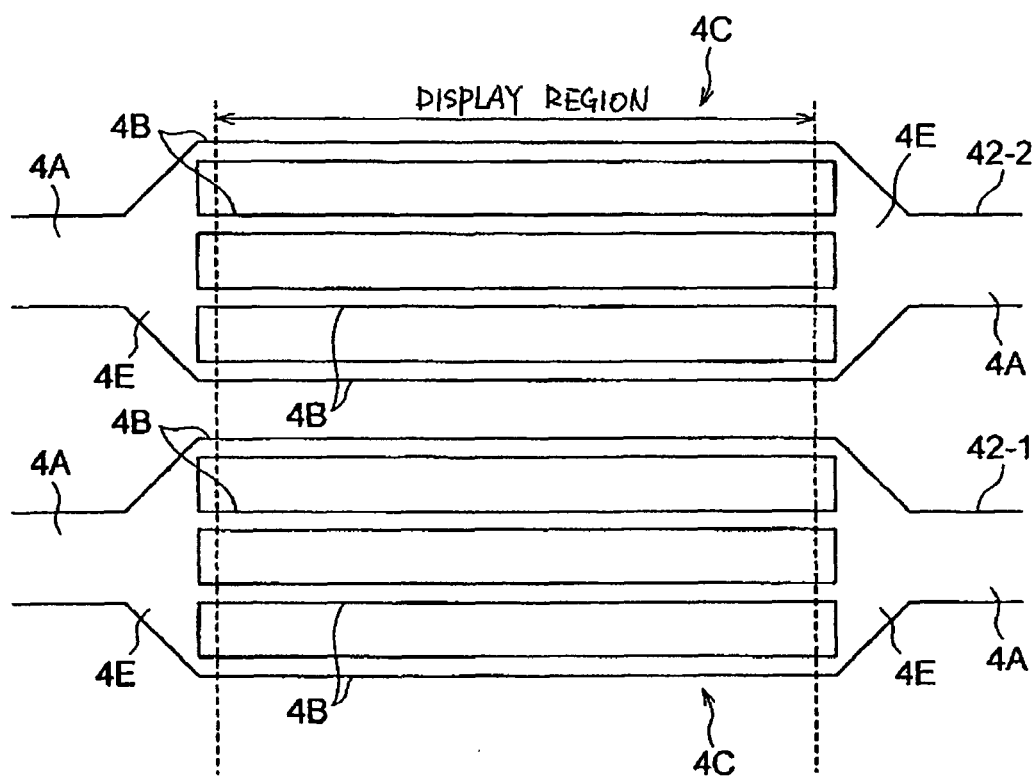
FIG. 9 is an enlarged plan view illustrating loop coils in an exemplary embodiment of the present invention.

FIG. 9 is an enlarged plan view illustrating a structure of loop coils according to an exemplary embodiment of the present invention.

In FIG. 9, loop coils 42-1 and 42-2 are illustrated as an example. The structure of all the loop coils in loop coil groups 42 and 44 may be similar to the structure of the loop coils 42-1 and 42-2 illustrated in FIG. 5.

In the structure illustrated in FIG. 9, instead of the branch-connecting portion 4D of the loop coils 42-1 and 42-2 in the above-mentioned embodiment, a branch-connecting portion 4E is provided. The branch-connecting portion 4E is a portion where the base line portion 4A meets the narrow lines 4B (i.e., a connection portion). The branch-connecting portion 4E is made of a conductor similar to the base line portion 4A and the narrow lines 4B. The branch-connecting portion 4E has a shape which expands between narrow line portions 4C at both ends of the narrow lines 4B, outside of a display region of the display panel 5 (see FIGS. 1 and 2). The area of this branch-connecting portion 4E is made larger than that of the above-mentioned branch-connecting portion 4D, so that the electric resistance value may be reduced at the portion where the base line portion 4A and the narrow line portion 4C are connected. Thus, the power consumption of the internal circuit 40 can be further minimized by reducing the electric resistance value of loop coils. Moreover, the power consumption of the tablet computer 3 (see FIG. 1) can also be reduced even further.

Example 2

Figure 10:
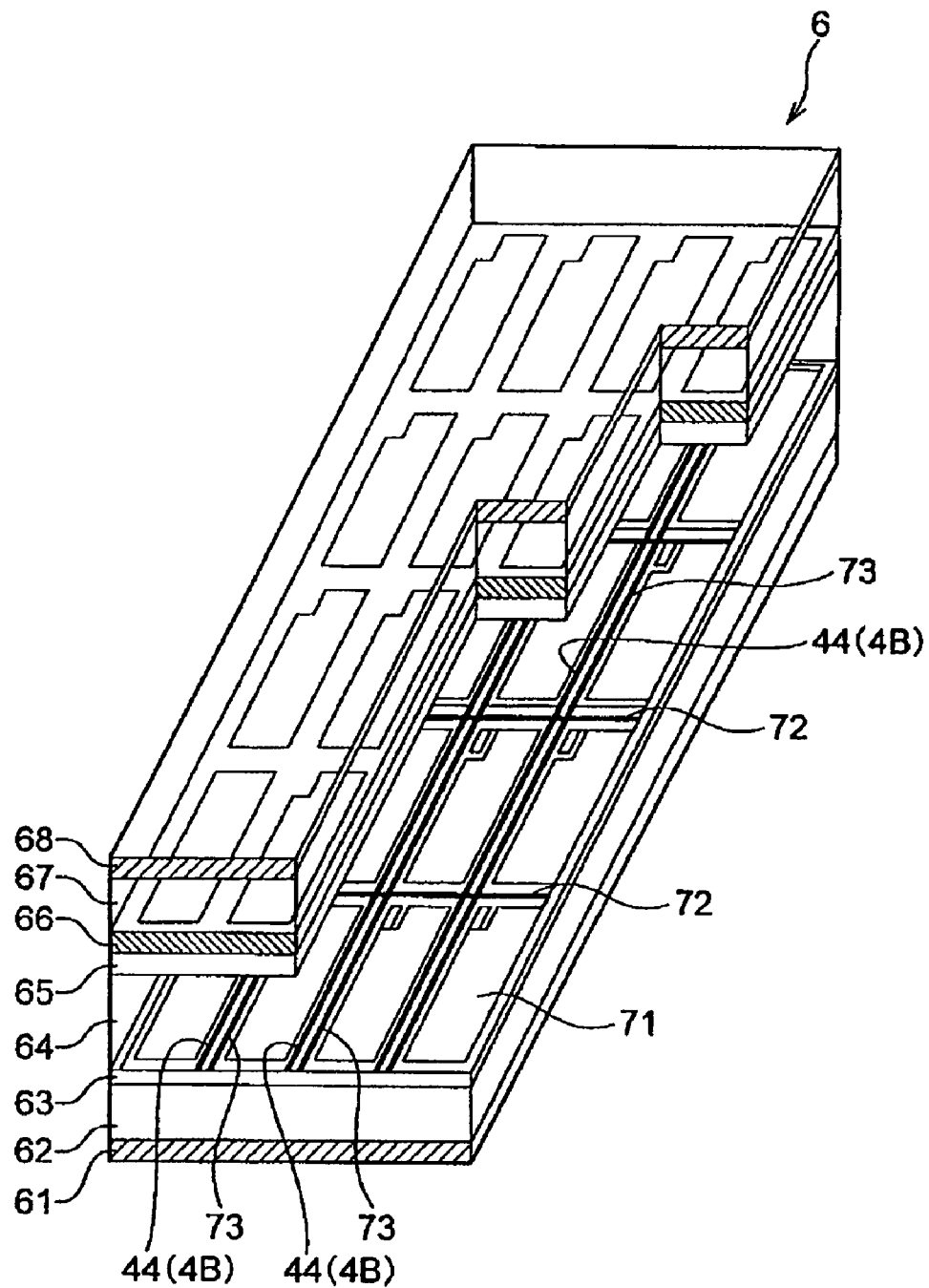
FIG. 10 is a partially broken perspective view illustrating a display panel in another exemplary embodiment of the present invention.

FIG. 10 is a cut out perspective view illustrating a structure of a display panel according to another exemplary embodiment of the present invention.

In this example, loop coils of loop coil groups 42 and 44 are formed inside a liquid crystal display panel 6.

The liquid crystal display panel 6 illustrated in FIG. 10 includes a polarization plate 61, a glass substrate 62 disposed on the polarization plate 61, a transparent conductor layer 63 disposed on the glass substrate 62, a liquid crystal layer 64 disposed on the transparent conductor layer 63, a transparent conductor layer 65 disposed on the liquid crystal layer 64, a color filter 66 disposed on the transparent conductor layer 65, a glass substrate 67 disposed on the color filter 66, and a polarization plate 68 disposed on the glass substrate 67. The liquid crystal display panel 6 emits light from below, for example, by using a cold-cathode tube backlight.

The liquid crystal display panel 6 is divided into segments, each of which shows any of the three colors of R (red), G (green) and B (blue), and segments of each color are combined to constitute one pixel 50. The color filter 66 has divided regions corresponding to each segment, and each region is colored R, G or B.

The transparent conductor layer 63 may be formed of, for example, ITO on the glass substrate 62 by vapor deposition. Segment electrodes 71 are formed by dividing the transparent conductor layer 63. Further, scanning signal lines 72 and data signal lines 73 are formed in the transparent conductor layer 63 to extend vertically and horizontally between the segment electrodes 71. By applying a voltage to the segment electrodes 71 from the scanning signal lines 72 and the data signal lines 73, an electric potential of the segment electrodes 71 can be changed, and the light transmittance of the liquid crystal layer 64 changes at the positions corresponding to respective segment electrodes 71.

Here, the scanning signal lines 72 and the data signal lines 73 formed in the transparent conductor layer 63 may be light-transmissible display conductors.

In this transparent conductor layer 63, narrow lines 4B which constitute loop coils of a first loop coil group 44 serving as detection conductors are provided in parallel with the data signal lines 73. Further, although not illustrated in FIG. 10, the narrow lines 4B which constitute loop coils of a second loop coil group 42 are provided in the direction parallel with the scanning signal lines 72.

These narrow lines 4B are formed by dividing the planar transparent conductor layer 63 similar to the segment electrodes 71, the scanning signal lines 72, and the data signal lines 73.

Further, in this case, base line portions 4A (not illustrated in FIG. 10) and branch-connecting portions 4D (not illustrated in FIG. 10) of the loop coils 42 and 44 are provided outside a region where the segment electrodes 71 are arranged in the liquid crystal display panel 6.

When the liquid crystal display panel 6 illustrated in FIG. 10 is used as a display input portion such as the display input portion 30 illustrated in FIGS. 1, 2, and 8, the loop coil groups 42 and 44 are formed in the transparent conductor layer 63 of the liquid crystal display panel 6 such that there is no need to overlap the loop coil groups 42 and 44 with the liquid crystal display panel 6. Therefore the display input portion (e.g., the display input portion 30) can be made more thin and compact than when the loop coil groups 42 and 44 are disposed on the surface of the display side of the display panel 5 (see FIGS. 2 and 3). Also, the loop coils in the loop coil groups 42 and 44 are positioned such that they do not attenuate light transmitted through the liquid crystal display panel 6, therefore display quality is not impaired at all.

Regarding the structure illustrated in FIG. 10, the narrow lines 4B are made extremely thin. However, as described above, since the loop coils in the loop coil groups 42 and 44 have a structure in which the plurality of narrow lines 4B are provided to be used as a whole (i.e., in parallel with each other), sufficient electric current can flow. As a result, an operation performed by a position indicator (e.g., the position indicator 2 of FIGS. 1 and 8) can be detected without fail.

In the structure illustrated in FIG. 10, the data signal lines 73 may also function as the narrow lines 4B of the loop coils, and/or the scanning signal lines 72 may also function as the narrow lines 4B of the loop coils.

It should be noted that although the loop coils of the loop coil groups 42 and 44 have been illustrated and described above as having two-turn coils, the present invention is not limited to this arrangement. Other numbers of turns of the loop coils can also be used with the present invention.

It should also be understood that although the display panel 5 of FIGS. 2 and 3 is illustrated and described as being a 12-inch liquid crystal display panel of XGA display, other types of display devices may also be used with the present invention. Specifically, size and resolution of a liquid crystal display panel can be arbitrarily decided, and the number of loop coils in the loop coil groups 42 and 44 can be determined based on the size and resolution of the display panel 5.

Additionally, other types of display devices besides a liquid crystal display panel can be used with the invention. For example, an organic EL (electro-luminescence) display panel, a PDP (plasma display panel), an FED (field emission display) including SED (surface-conduction electron-emitter display), and the like can also be used as the display panel 5 of the present invention.

If the display panel 5 is a PDP, discharge cells vertically and/or horizontally disposed may correspond to the pixels 50 in the previous embodiment(s).

Also, if the display panel 5 is, for example, formed of an SED, electron sources and fluorescent substances vertically and/or horizontally disposed correspond to the pixels 50 in the previous embodiment(s).

Additionally, it is possible to use a CRT (cathode ray tube) as the display panel 5. In this case, a combination of three dots disposed in respective divided regions on a screen, that is, a combination of fluorescent substances corresponding to three colors, corresponds to the pixel 50 in the previous embodiment(s).

Further, although the previous embodiment(s) and examples illustrate and describe that the position indicator 2 indicates a position by sending and receiving radio signals with the position-detecting portion 4 (see FIG. 3) incorporated in the tablet computer 3 (see FIG. 1), the present invention is not limited these embodiments. That is, signals may be transmitted in only one direction instead of both directions. For example, signals may be transmitted from the position indicator 2 including a power supply device to the position-detecting portion 4 (or vice versa). Furthermore, the position-detecting portion 4 may be configured as a detection circuit capable of detecting electrostatic capacity in the loop coil groups 42 and 44, or detecting a change in the electrostatic capacity of the loop coil groups 42 and 44. Here, the position indicator 2, a finger of a user, or the like may be used as an indicator. If the electrostatic capacity of the loop coil groups 42 and 44 has changed because of a position-inputting operation performed by the indicator, the position-inputting operation may be detected based on this change.

Further, although the position-detecting portion 4 is illustrated and described in previous embodiments as having the display input portion 30 (see FIGS. 1 and 8) and being provided in the tablet computer 3, the present invention is not limited to this arrangement. The position-detecting portion 4 (see FIG. 3) may be provided separately from a computer main unit (e.g., the tablet computer 3) which accommodates functional hardware components (e.g., CPU 31, ROM 32, RAM 33, storage portion 34, input portion 35, display portion 36, I/F 37 and bus 38) of the tablet computer 3 illustrated in FIG. 7. In this case, the position-detecting portion 4 (see FIG. 3) operated by the user can be made to have a compact size and the position-detecting portion 4 can be used with a different computer unit (i.e., the position detecting portion 4 can be used by a plurality of different computer units).

Moreover, the present invention is not intended to be limited to the tablet computer 3 described in the previous embodiments. The embodiments of the present invention can be applied to any kind of wirings provided on the surface of the display side of a display screen, in which visibility of the screen should not be reduced by the wirings themselves, and an electric resistance value of wirings is reduced.

Although a few embodiments of the present invention have been illustrated and described, it will be appreciated by those skilled in the art that changes may be made in these embodiments without departing from the principles and spirit of the general inventive concept, the scope of which is defined in the appended claims and their equivalents.

What is claimed is:

1. A display device, comprising:
 a display screen including:
 at least one light-transmissible display conductor extending in a predetermined plane of the display screen, and
 at least one detection conductor extending along the predetermined plane, the at least one detection conductor having at least one base line portion formed of a conductor of a first width and a narrow line portion including a plurality of narrow-line conductors of a second width connected in parallel between the at least one base line portion;
 the at least one detecting conductor including a first wide base portion on a first side of the display region, a second wide base portion on a second side of the display region, and a plurality of narrow line portions connected in parallel between the first and second wide base portions and extending across the display region.

2. A display device comprising:
 a display panel having a display region in which images are displayed; and
 a sensor panel disposed on a display side of the display panel, the sensor panel including at least one elongated detecting conductor having a first width outside the display region of the display panel and a second width in the display region of the display panel, the first and second widths being different from one another;
 the at least one detecting conductor including a first wide base portion on a first side of the display region, a second wide base portion on a second side of the display region, and a plurality of narrow line portions connected in parallel between the first and second wide base portions and extending across the display region.

3. The display device according to claim 2, wherein the display panel includes a plurality of pixels arranged in an array, and the narrow line portions of the at least one detecting conductor extend in between adjacent pixels.

4. The display device according to claim 2, wherein the at least one detecting conductor is transparent.

5. A display device comprising:
 a display panel having a display region in which images are displayed; and
 a sensor panel disposed on a display side of the display panel, the sensor panel including at least one elongated detecting conductor having a first width outside the display region of the display panel and a second width in the display region of the display panel, the first and second widths being different from one another;
 the at least one detecting conductor comprising a first group of loop coils extending along a first direction of the display panel and a second group of loop coils extending along a second direction of the display panel, the first and second directions forming an angle with each other.

6. The display device according to claim 5, wherein the display panel includes a plurality of pixels, the display panel is formed of a layered structure having at least one electrode layer that activates the pixels, and the at least one detecting conductor is formed in the at least one electrode layer.

7. The display device according to claim 6, wherein the at least one detecting conductor comprises a signal line that activates a corresponding pixel of the display panel such that an image forming operation of the display panel is alternated with a position detecting operation of the sensor panel such that the signal line is used for instructing the corresponding pixel during the image forming operation and the signal line us used for detecting a position on the sensor panel during the position detecting operation.

8. The display device according to claim 5, wherein the at least one detecting conductor is transparent.

9. A sensor panel coupled with a display surface of a display device, the sensor panel comprising:
 a plurality of detection conductors, each of the detection conductors including a base line portion formed of a conductor of a predetermined width and a narrow line portion formed of a plurality of narrow-line conductors being connected in parallel having ends on both sides thereof which are connected to the base line portion, the narrow-line conductors being narrower than said predetermined width;
 said narrow line portion overlapping with a display region of said display device and said base line portion not overlapping with said display region of said display device;
 said at least one detection conductor formed of loop coils of one or more turns.

10. The display device according to claim 9, wherein the detecting conductors are transparent.

11. A sensor panel usable with a display device, the sensor panel comprising:
 a plurality of detecting conductors extending along a major plane of the sensor panel, each of the detecting conductors including a first short and wide portion, a plurality of long and narrow portions connected in parallel with the first short and wide portion at first ends thereof, and a second short and wide portion connected to second ends of the plurality of long and narrow portions;
 the plurality of detecting conductors comprising a first group of loop coils extending along a first direction of the major plane and a second group of loop coils extending along a second direction of the major plane, the first and second directions forming an angle with each other.

12. The position-detecting device according to claim 11, wherein said detection circuit comprises:
 a selector to select a detection conductor from said plurality of detection conductors provided in said sensor panel;
 a signal detector which, when a signal has been transmitted from said position indicator, detects said signal received by the selected detection conductor; and
 a detection processor which calculates a position indicated by said position indicator based on said detected signal.

13. The display device according to claim 11, wherein the detecting conductors are transparent.

14. A position-inputting device, comprising:
a position indicator including at least one coil; and
a position-detecting device for detecting a position-inputting operation performed by said position indicator, said position-detecting device including:
  a sensor panel coupled with a display surface of a display device, the sensor panel including a plurality of detection conductors, each of the detection conductors including a base line portion formed of a conductor of a predetermined width and a narrow line portion formed of a plurality of narrow-line conductors being connected in parallel having ends on both sides thereof which are connected to the base line portion, the narrow-line conductors being narrower than said predetermined width, said narrow line portion overlapping with a display region of said display device and said base line portion does not overlap with said display region of said display device, and
  a detection circuit which, by detecting electromagnetic interaction between said detection conductors provided in said sensor panel and the at least one coil included in said position indicator, detects a position-inputting operation performed by said position indicator.

15. The position-inputting device according to claim 14, wherein the detecting conductors are transparent.

16. A computer system, comprising:
a position-inputting device including a position indicator having at least one coil; and
a position-detecting device for detecting a position-inputting operation performed by said position indicator, said position-detecting device including:
  a sensor panel coupled with a display surface of a display device, the sensor panel including a plurality of detection conductors, each of the detection conductors including a base line portion formed of a conductor of a predetermined width and a narrow line portion formed of a plurality of narrow-line conductors being connected in parallel having ends on both sides thereof which are connected to the base line portion, the narrow-line conductors being narrower than said predetermined width, said narrow line portion overlapping with a display region of said display device and said base line portion does not overlap with said display region of said display device, and
  a detection circuit which, by detecting electromagnetic interaction between said detection conductors provided in said sensor panel and the at least one coil included in said position indicator, detects a position-inputting operation performed by said position indicator.

17. The computer system according to claim 16, wherein the detecting conductors are transparent.

18. A method of manufacturing a sensor panel for use with a display device, the method comprising the steps of:
providing a substrate;
forming a plurality of detecting conductors extending along a plane of the sensor panel on the substrate, each of the detecting conductors including a first wide portion, a plurality of narrow portions connected in parallel with the first wide portion at first ends thereof, and a second wide portion connected to second ends of the plurality of narrow portions; and
applying the substrate having the detecting conductors to the display panel;
said plurality of detecting conductors comprising first and second loop coil groups along different directions on the substrate and first and second insulating layers between the first and second loop coil groups.

19. The method of claim 18, wherein the forming of the detecting conductors is performed by one or more of a coating process, a vapor deposition process, a printing process, a spraying process, an etching process, and an adhesion process.

20. The method according to claim 18, wherein the detecting conductors are transparent.

* * * * *